(12) United States Patent
Liu et al.

(10) Patent No.: US 12,305,917 B1
(45) Date of Patent: May 20, 2025

(54) METHOD FOR DETERMINING DRYING OF FOOD WASTE DISPOSER

(71) Applicant: Bigland Electric Appliance Co., Ltd., Guangdong (CN)

(72) Inventors: Zhimin Liu, Dongguan (CN); Dongyuan Lin, Dongguan (CN); Tiejiang Luo, Dongguan (CN); Shuo Huang, Dongguan (CN)

(73) Assignee: Bigland Electric Appliance Co., Ltd., Dongguan (CN)

( * ) Notice: Subject to any disclaimer, the term of this patent is extended or adjusted under 35 U.S.C. 154(b) by 0 days.

(21) Appl. No.: 19/013,114

(22) Filed: Jan. 8, 2025

(30) Foreign Application Priority Data

Oct. 23, 2024 (CN) .......................... 202411483912.9

(51) Int. Cl.
*F26B 25/22* (2006.01)
*E03C 1/266* (2006.01)
*G05D 22/00* (2006.01)

(52) U.S. Cl.
CPC ............. *F26B 25/22* (2013.01); *G05D 22/00* (2013.01); *E03C 1/2665* (2013.01)

(58) Field of Classification Search
CPC ........ F26B 25/22; G05D 22/00; E03C 1/2665
USPC .......................................................... 34/282
See application file for complete search history.

(56) References Cited

U.S. PATENT DOCUMENTS

| | | | | |
|---|---|---|---|---|
| 5,675,913 A * | 10/1997 | Matsuda | ............... | F26B 13/145 34/526 |
| 6,092,301 A * | 7/2000 | Komanowsky | ......... | F26B 5/048 34/265 |
| 6,684,648 B2 * | 2/2004 | Faqih | ...................... | E03B 3/28 62/93 |
| 7,024,796 B2 * | 4/2006 | Carin | .................... | F26B 23/001 34/514 |
| 7,404,262 B2 * | 7/2008 | Jurkovich | ............. | A23K 40/00 34/381 |
| 8,051,637 B2 * | 11/2011 | Labrador | .................. | F03G 7/00 60/39.01 |
| 8,904,668 B2 * | 12/2014 | Priebe | ..................... | F26B 3/22 101/450.1 |
| 9,341,410 B1 * | 5/2016 | Griffin | .................... | F26B 17/04 |
| 9,764,868 B2 * | 9/2017 | Hu | ........................ | B65B 51/146 |
| 9,976,804 B2 * | 5/2018 | Hanawa | ................... | F26B 5/00 |
| 10,005,669 B2 * | 6/2018 | Hou | .......................... | F27B 7/20 |

(Continued)

FOREIGN PATENT DOCUMENTS

WO WO-2006078315 A1 * 7/2006 ............ F01K 27/00

*Primary Examiner* — Stephen M Gravini
(74) *Attorney, Agent, or Firm* — Justin Lampel (57) ABSTRACT

A method for determining a drying of a food waste disposer contains steps of: saving a comparison table of a pressure temperature of a saturated water vapor in a control unit of the food waste disposer; starting drying process; and calculating. The method further contains a step of judging automatically, after calculating the current target humidity value $U_b$, the control unit compares the current relative humidity $U_1$ with the current target humidity value $U_b$ and automatically determines a drying status of the food waste disposer and controls a working status of the drying device based on a comparison result.

8 Claims, 5 Drawing Sheets

(56) References Cited

U.S. PATENT DOCUMENTS 12,145,758 B1 * 11/2024 Weng ..................... B65B 61/06
12,246,266 B2 *  3/2025 Andrews .................. F26B 5/04

* cited by examiner

FIG. 1

| Table 1-1 | | | | | | | | | | |
|---|---|---|---|---|---|---|---|---|---|---|
| Pure horizontal liquid level saturated water pressure calculation table (kPa) | | | | | | | | | | |
| t/°C | 0 | 0.1 | 0.2 | 0.3 | 0.4 | 0.5 | 0.6 | 0.7 | 0.8 | 0.9 |
| 0 | 0.611 | 0.615 | 0.62 | 0.624 | 0.629 | 0.633 | 0.638 | 0.642 | 0.647 | 0.652 |
| 1 | 0.657 | 0.661 | 0.666 | 0.671 | 0.676 | 0.681 | 0.685 | 0.690 | 0.695 | 0.7 |
| 2 | 0.705 | 0.711 | 0.716 | 0.721 | 0.726 | 0.731 | 0.736 | 0.742 | 0.747 | 0.752 |
| 3 | 0.758 | 0.763 | 0.768 | 0.774 | 0.779 | 0.785 | 0.79 | 0.796 | 0.802 | 0.807 |
| 4 | 0.813 | 0.819 | 0.825 | 0.83 | 0.836 | 0.842 | 0.848 | 0.854 | 0.86 | 0.866 |
| 5 | 0.872 | 0.878 | 0.884 | 0.891 | 0.897 | 0.903 | 0.909 | 0.916 | 0.922 | 0.928 |
| 6 | 0.935 | 0.941 | 0.948 | 0.955 | 0.961 | 0.968 | 0.974 | 0.981 | 0.988 | 0.955 |
| 7 | 1.002 | 1.009 | 1.016 | 1.022 | 1.03 | 1.037 | 1.044 | 1.051 | 1.058 | 1.065 |
| 8 | 1.073 | 1.08 | 1.087 | 1.095 | 1.102 | 1.11 | 1.117 | 1.125 | 1.132 | 1.14 |
| 9 | 1.148 | 1.156 | 1.164 | 1.171 | 1.179 | 1.187 | 1.195 | 1.203 | 1.212 | 1.22 |
| 10 | 1.228 | 1.236 | 1.244 | 1.253 | 1.261 | 1.27 | 1.278 | 1.287 | 1.295 | 1.304 |
| 11 | 1.313 | 1.321 | 1.33 | 1.339 | 1.348 | 1.357 | 1.366 | 1.375 | 1.384 | 1.393 |
| 12 | 1.403 | 1.412 | 1.421 | 1.431 | 1.44 | 1.45 | 1.459 | 1.469 | 1.478 | 1.488 |
| 13 | 1.498 | 1.508 | 1.518 | 1.528 | 1.538 | 1.548 | 1.558 | 1.568 | 1.578 | 1.588 |
| 14 | 1.599 | 1.069 | 1.62 | 1.63 | 1.641 | 1.652 | 1.662 | 1.673 | 1.684 | 1.695 |
| 15 | 1.706 | 1.717 | 1.728 | 1.739 | 1.75 | 1.761 | 1.773 | 1.784 | 1.796 | 1.807 |
| 16 | 1.819 | 1.83 | 1.842 | 1.854 | 1.866 | 1.878 | 1.89 | 1.902 | 1.914 | 1.926 |
| 17 | 1.938 | 1.951 | 1.963 | 1.976 | 1.988 | 2.001 | 2.013 | 2.026 | 2.039 | 2.052 |
| 18 | 2.065 | 2.078 | 2.091 | 2.104 | 2.117 | 2.131 | 2.144 | 2.158 | 2.171 | 2.185 |
| 19 | 2.198 | 2.212 | 2.226 | 2.24 | 2.254 | 2.268 | 2.282 | 2.296 | 2.311 | 2.325 |
| 20 | 2.339 | 2.354 | 2.369 | 2.383 | 2.398 | 2.413 | 2.428 | 2.443 | 2.485 | 2.473 |
| 21 | 2.488 | 2.504 | 2.519 | 2.535 | 2.55 | 2.566 | 2.582 | 2.598 | 2.614 | 2.63 |
| 22 | 2.646 | 2.662 | 2.678 | 2.694 | 2.711 | 2.727 | 2.744 | 2.761 | 2.778 | 2.794 |
| 23 | 2.811 | 2.828 | 2.846 | 2.863 | 2.88 | 2.898 | 2.915 | 2.933 | 2.95 | 2.968 |
| 24 | 2.986 | 3.004 | 3.022 | 3.04 | 3.059 | 3.077 | 3.096 | 3.114 | 3.133 | 3.152 |
| 25 | 3.17 | 3.189 | 3.208 | 3.228 | 3.247 | 3.266 | 3.286 | 3.305 | 3.325 | 3.345 |

FIG. 2-1

| Table1-2 (Continue based on the above table) | | | | | | | | | | |
|---|---|---|---|---|---|---|---|---|---|---|
| Pure horizontal liquid level saturated water pressure calculation table (kPa) | | | | | | | | | | |
| t/°C | 0 | 0.1 | 0.2 | 0.3 | 0.4 | 0.5 | 0.6 | 0.7 | 0.8 | 0.9 |
| 26 | 3.364 | 3.384 | 3.404 | 3.425 | 3.445 | 3.465 | 3.486 | 3.506 | 3.527 | 3.548 |
| 27 | 3.569 | 3.59 | 3.611 | 3.632 | 3.653 | 3.675 | 3.696 | 3.718 | 3.74 | 3.762 |
| 28 | 3.784 | 3.806 | 3.828 | 3.85 | 3.873 | 3.895 | 3.918 | 3.941 | 3.964 | 3.987 |
| 29 | 4.01 | 4.033 | 4.056 | 4.08 | 4.103 | 4.127 | 4.151 | 4.175 | 4.199 | 4.223 |
| 30 | 4.248 | 4.272 | 4.297 | 4.321 | 4.346 | 4.371 | 4.396 | 4.421 | 4.447 | 4.472 |
| 31 | 4.498 | 4.523 | 4.549 | 4.575 | 4.601 | 4.627 | 4.654 | 4.68 | 4.707 | 4.733 |
| 32 | 4.76 | 4.787 | 4.814 | 4.842 | 4.869 | 4.897 | 4.924 | 4.952 | 4.98 | 5.008 |
| 33 | 5.036 | 5.046 | 5.093 | 5.122 | 5.15 | 5.179 | 5.208 | 5.237 | 5.267 | 5.296 |
| 34 | 5.326 | 5.356 | 5.385 | 5.415 | 5.446 | 5.476 | 5.506 | 5.537 | 5.568 | 5.599 |
| 35 | 5.63 | 5.661 | 5.692 | 5.724 | 5.755 | 5.787 | 5.819 | 5.851 | 5.884 | 5.916 |
| 36 | 5.949 | 5.981 | 6.014 | 6.047 | 6.08 | 6.114 | 6.147 | 6.181 | 6.215 | 6.249 |
| 37 | 6.283 | 6.317 | 6.352 | 6.386 | 6.421 | 6.456 | 6.491 | 6.527 | 6.562 | 6.598 |
| 38 | 6.633 | 6.669 | 6.706 | 6.742 | 6.778 | 6.815 | 6.852 | 6.889 | 6.926 | 6.963 |
| 39 | 7.001 | 7.038 | 7.076 | 7.114 | 7.153 | 7.191 | 7.229 | 7.268 | 7.307 | 7.346 |
| 40 | 7.385 | 7.425 | 7.465 | 7.504 | 7.544 | 7.585 | 7.625 | -7.666 | 7.706 | 7.747 |
| 41 | 7.788 | 7.83 | 7.871 | 7.913 | 7.955 | 7.997 | 8.039 | 8.081 | 8.124 | 8.167 |
| 42 | 8.21 | 8.253 | 8.297 | 8.34 | 8.384 | 8.428 | 8.472 | 8.517 | 8.561 | 8.606 |
| 43 | 8.651 | 8.696 | 8.742 | 8.787 | 8.833 | 8.879 | 8.925 | 8.972 | 9.019 | 9.065 |
| 44 | 9.112 | 9.16 | 9.207 | 9.255 | 9.303 | 9.351 | 9.399 | 9.448 | 9.497 | 9.546 |
| 45 | 9.595 | 9.644 | 9.694 | 9.744 | 9.794 | 9.844 | 9.895 | 9.946 | 9.997 | 10.048 |
| 46 | 10.099 | 10.151 | 10.203 | 10.255 | 10.307 | 10.36 | 10.413 | 10.466 | 10.519 | 10.572 |
| 47 | 10.626 | 10.68 | 10.734 | 10.789 | 10.843 | 10.898 | 10.953 | 11.009 | 11.064 | 11.12 |
| 48 | 11.176 | 11.233 | 11.289 | 11.346 | 11.403 | 11.461 | 11.518 | 11.576 | 11.634 | 11.692 |
| 49 | 11.751 | 11.81 | 11.869 | 11.928 | 11.988 | 12.048 | 12.108 | 12.168 | 12.229 | 12.29 |
| 50 | 12.351 | 12.412 | 12.474 | 12.536 | 12.598 | 12.66 | 12.723 | 12.786 | 12.849 | 12.913 |

FIG. 2-2

| Table 1-3 (Continue based on the above table) | | | | | | | | | | |
|---|---|---|---|---|---|---|---|---|---|---|
| Pure horizontal liquid level saturated water pressure calculation table (kPa) | | | | | | | | | | |
| t/°C | 0 | 0.1 | 0.2 | 0.3 | 0.4 | 0.5 | 0.6 | 0.7 | 0.8 | 0.9 |
| 51 | 12.977 | 13.041 | 13.105 | 13.169 | 13.234 | 13.299 | 13.365 | 13.431 | 13.497 | 13.563 |
| 52 | 13.629 | 13.696 | 13.763 | 13.83 | 13.898 | 13.966 | 14.034 | 14.103 | 14.172 | 14.241 |
| 53 | 14.31 | 14.38 | 14.45 | 14.52 | 14.59 | 14.661 | 14.732 | 14.804 | 14.875 | 14.947 |
| 54 | 15.019 | 15.092 | 15.165 | 15.238 | 15.312 | 15.385 | 15.459 | 15.534 | 15.609 | 15.684 |
| 55 | 15.759 | 15.835 | 15.91 | 15.987 | 16.063 | 16.14 | 16.217 | 16.295 | 16.373 | 16.45 |
| 56 | 16.529 | 16.608 | 16.687 | 16.766 | 16.846 | 16.926 | 17.007 | 17.087 | 17.168 | 17.25 |
| 57 | 17.331 | 17.413 | 17.496 | 17.578 | 17.661 | 17.745 | 17.828 | 17.913 | 17.997 | 18.082 |
| 58 | 18.167 | 18.252 | 18.338 | 18.424 | 18.51 | 18.597 | 18.684 | 18.771 | 18.859 | 18.947 |
| 59 | 19.036 | 19.125 | 19.214 | 19.303 | 19.393 | 19.484 | 19.574 | 19.665 | 19.757 | 19.848 |
| 60 | 19.94 | 20.033 | 20.126 | 20.219 | 20.312 | 20.406 | 20.5 | 20.595 | 20.69 | 20.785 |
| 61 | 20.881 | 20.977 | 21.074 | 21.171 | 21.268 | 21.365 | 21.463 | 21.562 | 21.661 | 21.76 |
| 62 | 21.859 | 21.959 | 22.06 | 22.16 | 22.261 | 22.363 | 22.465 | 22.567 | 22.67 | 22.773 |
| 63 | 22.876 | 22.98 | 23.084 | 23.189 | 23.294 | 23.4 | 23.506 | 23.612 | 23.719 | 23.826 |
| 64 | 23.933 | 24.041 | 24.149 | 24.258 | 24.367 | 24.477 | 24.587 | 24.697 | 24.808 | 24.92 |
| 65 | 25.031 | 25.143 | 25.256 | 25.369 | 25.482 | 25.596 | 25.71 | 25.825 | 25.94 | 26.056 |
| 66 | 26.172 | 26.288 | 26.405 | 26.522 | 26.64 | 26.758 | 26.877 | 26.996 | 27.116 | 27.236 |
| 67 | 27.356 | 27.477 | 27.598 | 27.72 | 27.842 | 27.965 | 28.088 | 28.212 | 28.336 | 28.46 |
| 68 | 28.585 | 28.711 | 28.837 | 28.963 | 29.09 | 29.217 | 29.345 | 29.474 | 29.602 | 29.732 |
| 69 | 29.861 | 29.991 | 30.122 | 30.253 | 30.385 | 30.517 | 30.65 | 30.783 | 30.916 | 31.05 |
| 70 | 31.185 | 31.32 | 31.456 | 31.592 | 31.728 | 31.865 | 32.003 | 32.141 | 32.279 | 32.418 |
| 71 | 32.558 | 32.698 | 32.839 | 32.98 | 33.121 | 33.263 | 33.406 | 33.549 | 33.693 | 33.837 |
| 72 | 33.982 | 34.127 | 34.273 | 34.419 | 34.566 | 34.713 | 34.861 | 35.009 | 35.158 | 35.308 |
| 73 | 35.457 | 35.608 | 35.759 | 35.911 | 36.063 | 36.216 | 36.369 | 36.523 | 36.677 | 36.832 |
| 74 | 36.987 | 37.143 | 37.3 | 37.457 | 37.614 | 37.773 | 37.931 | 38.091 | 38.251 | 38.411 |
| 75 | 38.572 | 38.734 | 38.896 | 39.058 | 39.222 | 39.386 | 39.55 | 39.715 | 39.881 | 40.047 |

FIG. 2-3

| Table 1-4 (Continue based on the above table) ||||||||||
| Pure horizontal liquid level saturated water pressure calculation table (kPa) ||||||||||
| t/°C | 0 | 0.1 | 0.2 | 0.3 | 0.4 | 0.5 | 0.6 | 0.7 | 0.8 | 0.9 |
| --- | --- | --- | --- | --- | --- | --- | --- | --- | --- | --- |
| 76 | 40.214 | 40.381 | 40.549 | 40.718 | 40.887 | 41.056 | 41.227 | 41.398 | 41.569 | 41.741 |
| 77 | 41.914 | 42.087 | 42.261 | 42.436 | 42.611 | 42.786 | 42.963 | 43.14 | 43.317 | 43.495 |
| 78 | 43.674 | 43.854 | 44.034 | 44.214 | 44.396 | 44.577 | 44.76 | 44.943 | 45.127 | 45.311 |
| 79 | 45.496 | 45.682 | 45.868 | 46.055 | 46.243 | 46.431 | 46.62 | 46.809 | 46.999 | 47.19 |
| 80 | 47.382 | 47.574 | 47.767 | 47.96 | 48.154 | 48.349 | 48.544 | 48.74 | 48.937 | 49.134 |
| 81 | 49.332 | 49.531 | 49.731 | 49.931 | 50.131 | 50.333 | 50.535 | 50.738 | 50.941 | 51.145 |
| 82 | 51.35 | 51.556 | 51.762 | 51.969 | 52.176 | 52.385 | 52.594 | 52.803 | 53.014 | 53.225 |
| 83 | 53.436 | 53.649 | 53.862 | 54.076 | 54.291 | 54.506 | 54.722 | 54.939 | 55.156 | 55.374 |
| 84 | 55.593 | 55.813 | 56.033 | 56.254 | 56.476 | 56.699 | 56.922 | 57.146 | 57.371 | 57.596 |
| 85 | 57.823 | 58.05 | 58.278 | 58.506 | 58.735 | 58.965 | 59.196 | 59.427 | 59.66 | 59.893 |
| 86 | 60.126 | 60.361 | 60.596 | 60.832 | 61.069 | 61.307 | 61.545 | 61.784 | 62.024 | 62.265 |
| 87 | 62.506 | 62.749 | 62.992 | 63.236 | 63.48 | 63.726 | 63.972 | 64.219 | 64.467 | 64.715 |
| 88 | 64.965 | 65.215 | 65.466 | 65.718 | 65.97 | 66.224 | 66.478 | 66.733 | 66.989 | 67.245 |
| 89 | 67.503 | 67.761 | 68.021 | 68.28 | 68.541 | 68.803 | 69.065 | 69.329 | 69.593 | 69.858 |
| 90 | 70.124 | 70.39 | 70.658 | 70.926 | 71.195 | 71.465 | 71.736 | 72.008 | 72.281 | 72.554 |
| 91 | 72.829 | 73.104 | 73.38 | 73.657 | 73.935 | 74.213 | 74.493 | 74.773 | 75.055 | 75.337 |
| 92 | 75.62 | 75.904 | 76.189 | 76.474 | 76.761 | 77.049 | 77.337 | 77.626 | 77.917 | 78.208 |
| 93 | 78.5 | 78.793 | 79.087 | 79.381 | 79.677 | 79.974 | 80.271 | 80.570 | 80.869 | 81.169 |
| 94 | 81.47 | 81.773 | 82.076 | 82.38 | 82.685 | 82.990 | 83.297 | 83.605 | 83.914 | 84.223 |
| 95 | 84.534 | 84.845 | 85.158 | 85.471 | 85.786 | 86.101 | 86.418 | 86.735 | 87.053 | 87.372 |
| 96 | 87.693 | 88.014 | 88.336 | 88.659 | 88.983 | 89.308 | 89.634 | 89.961 | 90.289 | 90.618 |
| 97 | 90.949 | 91.28 | 91.612 | 91.945 | 92.279 | 92.614 | 92.95 | 93.287 | 93.625 | 93.964 |
| 98 | 94.304 | 94.645 | 94.988 | 95.331 | 95.675 | 96.02 | 96.367 | 96.714 | 97.062 | 97.412 |
| 99 | 97.762 | 98.114 | 98.466 | 98.820 | 99.174 | 99.53 | 99.887 | 100.245 | 100.603 | 100.963 |
| 100 | 101.324 | 101.686 | 102.049 | 102.414 | 102.779 | 103.145 | 103.513 | 103.881 | 104.251 | 104.621 |

FIG. 2-4 a drying of a food waste disposer according to a preferred embodiment of the present invention comprises steps of:

METHOD FOR DETERMINING DRYING OF FOOD WASTE DISPOSER

TECHNICAL FIELD

The present invention relates to a drying control unit for kitchen waste disposers, and more particularly to a method for determining a drying of a food waste disposer.

BACKGROUND

Kitchen waste disposers are used to convert kitchen waste into fertilizer. The program of the kitchen waste disposer stores a fixed reference humidity value for judging whether to stop drying. Each manufacturer of kitchen waste disposers determines whether to stop drying. According to product experience data, when the humidity measured by the hygrometer built into the food waste disposer reaches or falls below this standard humidity, the program of the food waste disposer will determine that the garbage and other contents in the inner barrel have been dried, thus ending a drying step and entering a next step.

The current drying control of food waste disposers includes setting a specific humidity value or other parameter values related to a based humidity value, and comparing the real-time measured value with it before deciding whether to stop a drying. However, the actual humidity value in the bucket will change with changes in ambient temperature and humidity. If the same referenced parameter value is used unchanged as a comparison value, misjudgment may occur to cause the contents in the bucket of the food waste disposer cannot be dried in a suitable state.

The present invention has arisen to mitigate and/or obviate the afore-described disadvantages.

SUMMARY

The primary aspect of the present invention is to provide a method for determining a drying of a food waste disposer by which the dynamic reference humidity value under different working conditions is calculated instantly to avoid the influence of ambient temperature and humidity on the judgment results based on different ambient temperatures and humidities.

To obtain above-mentioned aspect, a method for determining a drying of a food waste disposer contains steps of:

saving a comparison table of a pressure temperature of a saturated water vapor in a control unit of the food waste disposer, wherein multiple pressure values of the saturated water vapor corresponding to different temperatures under a standard atmospheric pressure condition are provided in the comparison table of the pressure temperature of the saturated water vapor;

starting drying process, wherein at a detection point in a manifold or an air duct of the food waste disposer for exhausting air flow, the control unit dries contents of a bucket through a drying device, and the control unit dries the contents of the bucket in a real time continuously by setting a detection element at the detection point to detect a temperature and a relative humidity of the detection point, wherein the control unit simultaneously records a temperature $T_0$ and a relative humidity $U_0$ detected by the detection element when starting the drying process;

calculating, wherein after going through an initial heating step and an evaporation step, the relative humidity of the detection point begins to decrease slowly, wherein when the control unit detects that a current relative humidity of the detection point is equal to or less than 80%, the control unit records a current detected temperature $T_1$ and a current relative humidity $U_1$, then the control unit looks up the comparison table of the pressure temperature of the saturated water vapor to acquire a saturated water vapor pressure $e_{c0}$ corresponding to a temperature $T_0$ and a saturated water vapor pressure $e_{c1}$ corresponding to the current detected temperature $T_1$, and the control unit calculates a current target humidity value $U_b$ according to a following calculation formula $U_b = e_{c0}/e_{c1} \times U_0 + a$, wherein $a$ is 1% to 10%; and judging automatically, wherein after calculating the current target humidity value $U_b$, the control unit compares the current relative humidity $U_1$ with the current target humidity value $U_b$ and automatically determines a drying status of the food waste disposer and controls a working status of the drying device based on a comparison result.

When the comparison result is $U_1 > U_b$, the control unit automatically determines a drying has not been completed, and the control unit controls the drying device to continue the drying.

When the comparison result is $U_1 \leq U_b$, the control unit automatically determines the drying is completed, and the control unit controls the drying device to stop the drying.

Accordingly, the method for determining the drying of the food waste disposer is capable of instantly calculating the dynamic reference humidity value under different working conditions to avoid the influence of ambient temperature and humidity on the judgment results based on different ambient temperatures and humidities.

BRIEF DESCRIPTION OF THE DRAWINGS

FIG. 2-1 is a comparison table of a pressure temperature of a saturated water vapor according to the preferred embodiment of the present invention.

FIG. 2-2 is another comparison table of the pressure temperature of the saturated water vapor according to the preferred embodiment of the present invention.

FIG. 2-3 is also another comparison table of the pressure temperature of the saturated water vapor according to the preferred embodiment of the present invention.

FIG. 2-4 is still another comparison table of the pressure temperature of the saturated water vapor according to the preferred embodiment of the present invention.

DETAILED DESCRIPTION

Figure 1:
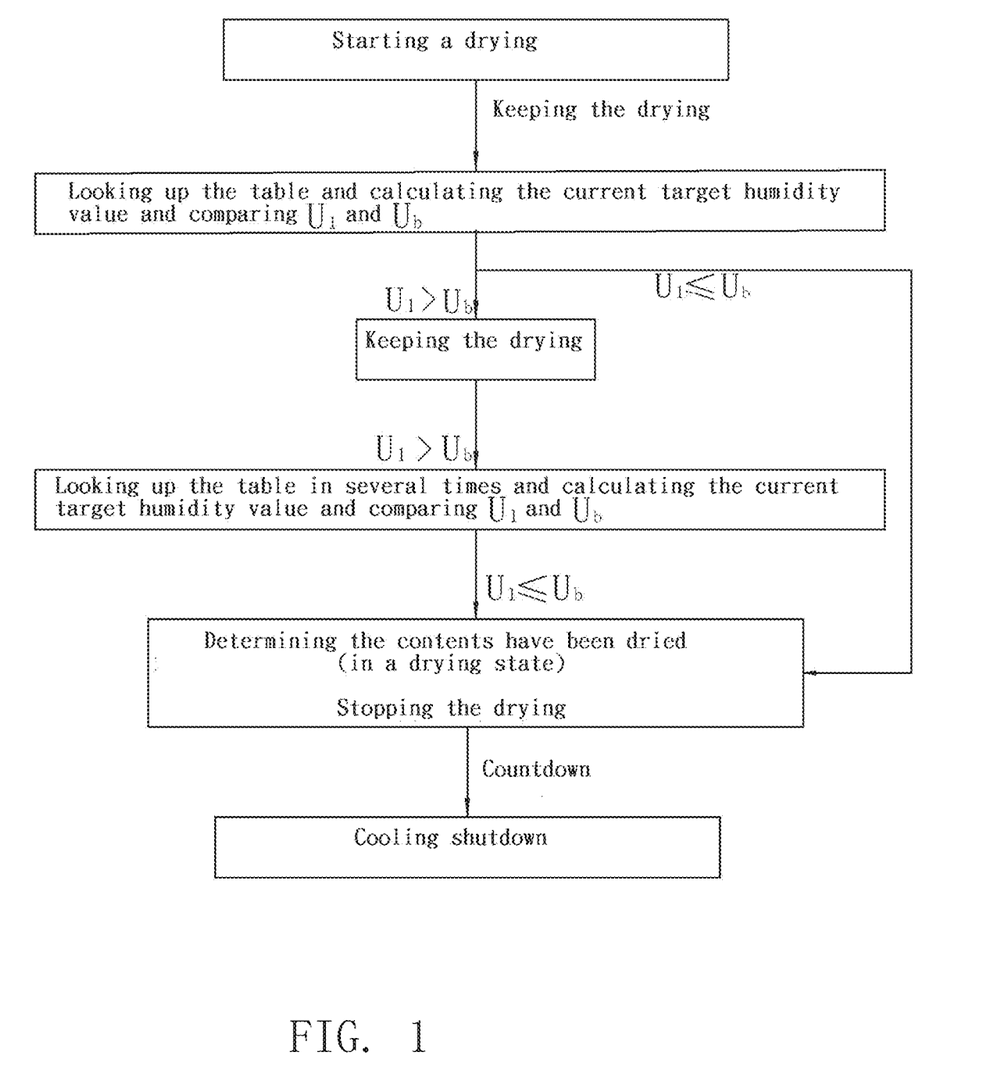
FIG. 1 is a flow chart of a method for determining a drying of a food waste disposer according to a preferred embodiment of the present invention.

With reference to FIG. 1, a method for determining a drying of a food waste disposer according to a preferred embodiment of the present invention comprises steps of:

saving a comparison table of a pressure temperature of a saturated water vapor in a control unit of the food waste disposer, wherein multiple pressure values of the saturated water vapor corresponding to different temperatures under a standard atmospheric pressure condition are provided in the comparison table of the pressure temperature of the saturated water vapor, as shown in FIGS. 2-1 to 2-4;

starting drying process, wherein at a detection point in a manifold or an air duct of the food waste disposer for exhausting air flow, the control unit dries contents of a bucket through a drying device, and the control unit dries the contents of the bucket in a real time continuously by setting a detection element at the detection point to detect a temperature and a relative humidity of the detection point, wherein the control unit simultaneously records a temperature $T_0$ and a relative humidity $U_0$ detected by the detection element when starting the drying process;

calculating, wherein after going through an initial heating step and an evaporation step, the relative humidity of the detection point begins to decrease slowly, wherein when the control unit detects that a current relative humidity of the detection point is equal to or less than 80%, the control unit records a current detected temperature $T_1$ and a current relative humidity $U_1$, then the control unit looks up the comparison table of the pressure temperature of the saturated water vapor to acquire a saturated water vapor pressure $e_{c0}$ corresponding to a temperature $T_0$ and a saturated water vapor pressure $e_{c1}$ corresponding to the current detected temperature $T_1$, and the control unit calculates a current target humidity value $U_b$ according to a following calculation formula $U_b = e_{c0}/e_{c1} \times U_0 + a$, wherein $a$ is 1% to 10%;

a is a correction parameter, which is adjusted and determined based on comprehensive errors such as measurement errors, and when a temperature range of the current temperature $T_1$ is detected to be 35° C.-80° C., a in the calculation formula is 3%-8%;

judging automatically, wherein after calculating the current target humidity value $U_b$, the control unit compares the current relative humidity $U_1$ with the current target humidity value $U_b$ and automatically determines a drying status of the food waste disposer and controls a working status of the drying device based on a comparison result, wherein when the comparison result is $U_1 > U_b$, the control unit automatically determines a drying has not been completed, and the control unit controls the drying device to continue the drying, when the comparison result is $U_1 \leq U_b$, the control unit automatically determines the drying is completed, and the control unit controls the drying device to stop the drying.

The drying device includes a heater disposed in the food waste disposer to heat a bottom of the bucket and to dry the contents of the bucket. An internal space of the bucket is communicated with an ambient air outside the food waste disposer via bores or gaps defined in the food waste disposer, and an air pressure of the internal space of the bucket is equal to an ambient air pressure outside the food waste disposer.

An exhaust fan is accommodated in the food waste disposer and is communicated with the internal space of the bucket via an air conduit, wherein the exhaust fan provides a negative pressure and draws water vapors evaporated from the bucket. The food waste disposer includes an air purifier received therein and communicated with the internal space of the bucket via a first air discharge channel, and the air purifier is also communicated with the exhaust fan via a second air discharge channel, such that the exhaust fan discharges filtered and purified airs out of the food waste disposer. A thermo hygrometer is connected above the bucket and is configured to directly detect a temperature and a humidity directly. Alternatively, the thermo hygrometer is accommodated in an air passage between the internal space of the bucket and the air purifier so as to indirectly detect the temperature and the humidity.

When an atmospheric pressure remains unchanged, the relative humidity at a certain temperature is a ratio of an absolute humidity to a saturated humidity.

As the temperature increases, an evaporation activity of water molecules intensifies, and a maximum water vapor content or a partial pressure of the water vapors in the air, i.e., the saturated humidity value, increases. Therefore, under a same water vapor content or a same partial pressure of the water vapors, when the temperature increases, the relative humidity decreases.

Since no additional water vapors are discharged with the air flow after the garbage in the bucket of the food waste disposer is dried, the content of the water vapors in discharged gas is close to a content of the water vapors in the ambient air.

The patent invention adopts the national standard GB11605-89 "Humidity Measurement Method" to measure the temperature and the relative humidity, and uses the saturated water vapor pressure gauge (0° C.-100° C.) as the database data of the comparison table of the pressure temperature of the saturated water vapor. Based on the real-time measured ambient temperature and humidity and the real-time measured temperature and relative humidity of the detection point after the work has stabilized, the current target relative humidity value in this state is calculated as a standard for judging whether the garbage in the bucket has been dried.

Preferably, in the step of judging automatically, when the comparison result is $U_1 \leq U_b$, the control unit controls the drying device to stop the drying and to perform a countdown cooling process. After ending the countdown cooling process, the machine stops and ends a program. Thus, the drying is completed, and the contents are dried to a suitable condition Preferably, a dynamic judgment method is added in the step of judging automatically, when the comparison result is $U_1 > U_b$, the control unit records a currently re-detected temperature $T_1$ and the relative humidity $U_1$ every 1 minute to 30 minutes and uses a newly recorded temperature $T_1$ and a relative humidity $U_1$ sequentially to repeatedly execute the step of calculating and the step of judging automatically. In the step of judging automatically, when the comparison result is $U_1 > U_b$, the control unit records the currently re-detected temperature $T_1$ and the relative humidity $U_1$ every 5 minutes to 15 minutes, then the control unit looks up the saturated water vapor pressure $e_{c1}$ from the comparison table of the pressure temperature of the saturated water vapor, and introduces the calculation formula into the step of calculating to recalculate the current target humidity value $U_b$, thereafter the step of automatically judging is executed repeatedly with the current target humidity value $U_b$ and a newly recorded relative humidity $U_1$.

The dynamic judgment method uses a repeated detection, a calculation and a determination at intervals. The reason is that the temperature of the detection point is not constant. For example, from the initial heating step to the evaporation step, the temperature of the detection point continues to rise in the beginning until it reaches a first thermal balance state and then remains stable for a period of time in the first thermal balance state; until all the liquid water in the bucket has evaporated, the temperature of the detection point gradually rises again until it reaches the second thermal balance state. In the second thermal balance state, the contents of the bucket are in a completely dry state.

In the drying process after the evaporation step, the temperature and the relative humidity of the detection point change, that is, the detection point has different temperatures $T_1$, different relative humidities $U_1$ and different current target humidity value $U_b$ at different times, so it is judged whether the contents has been dried needs to be judged in multiple times based on the temperatures $T_1$ at different time points, different relative humidities $U_1$ and the different current target humidity value $U_b$, hence the dynamic judgment method is configured to determine whether the contents of the bucket have been in drying state.

In this embodiment, the method for determining the drying of the food waste disposer is executed based on steps of:

1) turning on the food waste disposer to start the drying, wherein the temperature $T_0$ is 25° C. and the relative humidity $U_0$ is 80% when turning on the food waste disposer;
2) heating and drying the bucket for a period of time by using the waste food disposer, wherein after the evaporation step, the relative humidity is lowered, for example, the temperature $T_1$ of the detection point detected and recorded at a certain moment is 60° C. and the relative humidity $U_1$ of the detection point detected and recorded at the certain moment is 40%;
3) looking up the corresponding saturated water vapor pressures of temperature $T_0$ and the temperature $T_1$: $e_{c0}$=3170 Pa, $e_{c1}$=19940 Pa according to the comparison table of the pressure temperature of the saturated water vapor; wherein a is 4%;
4) calculating the current target humidity value $U_b$ when the temperature $T_1$ is 60° C., wherein $U_b = e_{c0}/e_{c1} * U_0 + 4\% = 3170/$ is changed to $19940 * 80\% + 4\% = 16.7\%$;

comparing the relative humidity $U_1$ with the current target humidity value $U_b$,
wherein the relative humidity $U_1$ (40%) is greater than the current target humidity value $U_b$ (16.7%), which meets a judgment condition of "when the comparison result is $U_1 > U_b$", the control unit automatically determines that the drying is not completed, and the control unit controls the drying device continues to dry;
5) repeating steps 2) to 4) are every 15 minutes, wherein when the control unit detecting, recording, calculating and judging repeatedly to obtain the result is not drying still, the drying process continues;
6) re-detecting the temperature and the relative humidity of the detection point based on a set interval at a certain moment by using the control unit, and detecting and recording that the temperature $T_1$ of the detection point is 71° C. and the relative humidity $U_1$ is 11%;
looking up the corresponding saturated water vapor pressures is $e_{c1}$=32558 Pa when the temperature $T_1$ is 71° C. based on the comparison table of the pressure temperature of the saturated water vapor, wherein a is 4%;
calculating the current target humidity value $U_b$ when the temperature $T_1$ is 71° C., wherein $U_b = 3170/32558 \times 80\% + 4\% = 11.8\%$;

comparing the relative humidity $U_1$ with the current target humidity value $U_b$,
wherein the relative humidity $U_1$ (11%) is smaller than the current target humidity value $U_b$ (11.8%), which meets a judgment condition of "when the comparison result is $U_1 \le U_b$", the control unit automatically determines that the drying is completed and controls the drying device continues to stop the drying and to enter to a cooling step.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. A method for determining a drying of a food waste disposer comprising steps of:
saving a comparison table of a pressure temperature of a saturated water vapor in a control unit of the food waste disposer, wherein multiple pressure values of the saturated water vapor corresponding to different temperatures under a standard atmospheric pressure condition are provided in the comparison table of the pressure temperature of the saturated water vapor;
starting drying process, wherein at a detection point in a manifold or an air duct of the food waste disposer for exhausting air flow, the control unit dries contents of a bucket through a drying device, and the control unit dries the contents of the bucket in a real time continuously by setting a detection element at the detection point to detect a temperature and a relative humidity of the detection point, wherein the control unit simultaneously records a temperature $T_0$ and a relative humidity $U_0$ detected by the detection element when starting the drying process;
calculating, wherein after going through an initial heating step and an evaporation step, the relative humidity of the detection point begins to decrease slowly, wherein when the control unit detects that a current relative humidity of the detection point is equal to or less than 80%, the control unit records a current detected temperature $T_1$ and a current relative humidity $U_1$, then the control unit looks up the comparison table of the pressure temperature of the saturated water vapor to acquire a saturated water vapor pressure $e_{c0}$ corresponding to a temperature $T_0$ and a saturated water vapor pressure $e_{c1}$ corresponding to the current detected temperature $T_1$, and the control unit calculates a current target humidity value $U_b$ according to a following calculation formula $U_b = e_{c0}/e_{c1} \times U_0 + a$, wherein $a$ is 1% to 10%; and judging automatically, wherein after calculating the current target humidity value $U_b$, the control unit compares the current relative humidity $U_1$ with the current target humidity value $U_b$ and automatically determines a drying status of the food waste disposer and controls a working status of the drying device based on a comparison result;
wherein when the comparison result is $U_1 > U_b$, the control unit automatically determines a drying has not been completed, and the control unit controls the drying device to continue the drying;
wherein when the comparison result is $U_1 < U_b$, the control unit automatically determines the drying is completed, and the control unit controls the drying device to stop the drying.

2. The method as claimed in claim 1, wherein an internal space of the bucket is communicated with an ambient air outside the food waste disposer via bores or gaps defined in the food waste disposer, and an air pressure of the internal space of the bucket is equal to an ambient air pressure outside the food waste disposer.

3. The method as claimed in claim 1, wherein an exhaust fan is accommodated in the food waste disposer and is communicated with the internal space of the bucket via an air conduit, wherein the exhaust fan provides a negative pressure and draws water vapors evaporated from the bucket; the food waste disposer includes an air purifier received therein and communicated with the internal space of the bucket via a first air discharge channel, and the air purifier is also communicated with the exhaust fan via a second air discharge channel, such that the exhaust fan discharges filtered and purified airs out of the food waste disposer.

4. The method as claimed in claim 1, wherein the drying device includes a heater disposed in the food waste disposer to heat a bottom of the bucket and to dry the contents of the bucket.

5. The method as claimed in claim 1, wherein when a temperature range of the current temperature $T_1$ is detected to be 35° C.-80° C., a in the calculation formula is 3%-8%.

6. The method as claimed in claim 1, wherein when the comparison result is $U_1 > U_b$, the control unit records a currently re-detected temperature $T_1$ and the relative humidity $U_1$ every 1 minute to 30 minutes and uses a newly recorded temperature $T_1$ and a relative humidity $U_1$ sequentially to repeatedly execute the step of calculating and the step of judging automatically.

7. The method as claimed in claim 6, wherein tn the step of judging automatically, when the comparison result is $U_1 > U_b$, the control unit records the currently re-detected temperature $T_1$ and the relative humidity $U_1$ every 5 minutes to 15 minutes, then the control unit looks up the saturated water vapor pressure $e_{c1}$ from the comparison table of the pressure temperature of the saturated water vapor, and introduces the calculation formula into the step of calculating to recalculate the current target humidity value $U_b$, thereafter the step of automatically judging is executed repeatedly with the current target humidity value $U_b$ and a newly recorded relative humidity $U_1$.

8. The method as claimed in claim 6, wherein in the step of judging automatically, when the comparison result is $U_1 \leq U_b$, the control unit controls the drying device to stop the drying and to perform a countdown cooling process; after ending the countdown cooling process, the machine stops and ends a program, thus the drying is completed, and the contents are dried to a suitable condition.

* * * * *